United States Patent
Scott

[19]

[11] Patent Number: 6,109,013
[45] Date of Patent: Aug. 29, 2000

[54] MULTIPURPOSE GARDENING TOOL

[76] Inventor: Ted Duane Scott, 4586 Kelso Creek Rd., Weldon, Calif. 93283

[21] Appl. No.: 09/233,729

[22] Filed: Jan. 14, 1999

[51] Int. Cl.[7] .................................................. A01D 7/00
[52] U.S. Cl. ................. 56/400.05; 56/400.2; 56/400.04; 7/114
[58] Field of Search ............................... 7/114, 115, 116; 294/51, 52; 56/400.01, 400.04, 400.05, 400.16, 400.2; 172/373, 374, 375, 378, 380

[56] References Cited

U.S. PATENT DOCUMENTS

| | | | |
|---|---|---|---|
| 938,001 | 10/1909 | Kropp | 294/52 |
| 1,050,685 | 1/1913 | Peacock | 56/400.06 |
| 1,127,233 | 2/1915 | Hadford | 172/375 |
| 2,309,266 | 1/1943 | Wenborg | 172/378 |
| 2,317,916 | 4/1943 | Kallal | 56/400.01 |
| 3,688,483 | 9/1972 | Hamilton | 56/400.11 |
| 4,157,119 | 6/1979 | Litchfield | 172/375 |
| 5,025,621 | 6/1991 | DeMarco | 56/400.05 |
| 5,411,101 | 5/1995 | Bonavitacola | 172/378 |
| 5,609,215 | 3/1997 | Rios et al. | 172/373 |
| 5,971,653 | 10/1999 | Harpell | 403/97 |

*Primary Examiner*—Thomas B. Will
*Assistant Examiner*—Arpad Fabian Kovacs
*Attorney, Agent, or Firm*—Kenneth G. Pritchard

[57] ABSTRACT

A handle is attached to a multipurpose gardening implement which has a rake on one side and a cutting bar on the opposite side that has limited movement when used as a cutting tool. Rotation of the handle 180° changes use of the implement from a rake to a hoe or vice versa.

2 Claims, 1 Drawing Sheet

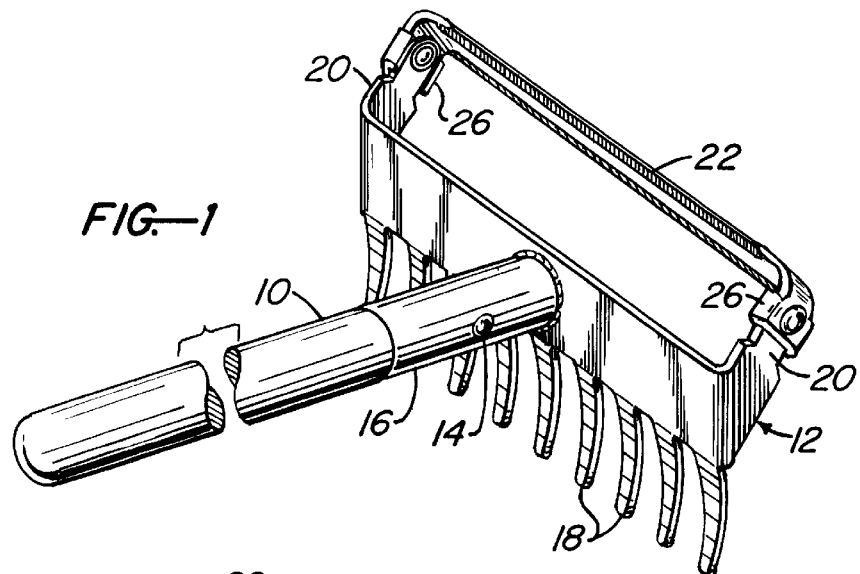
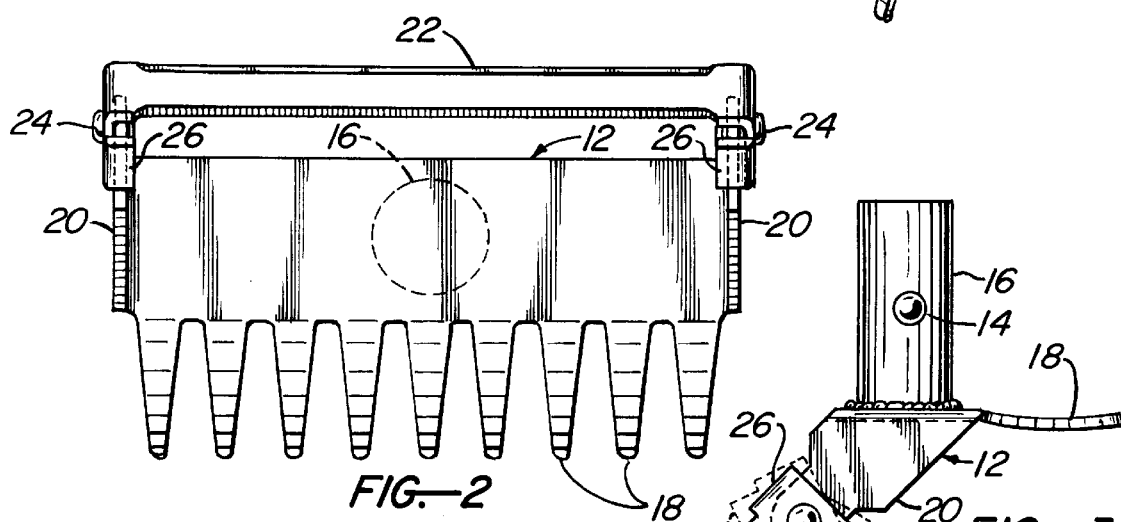
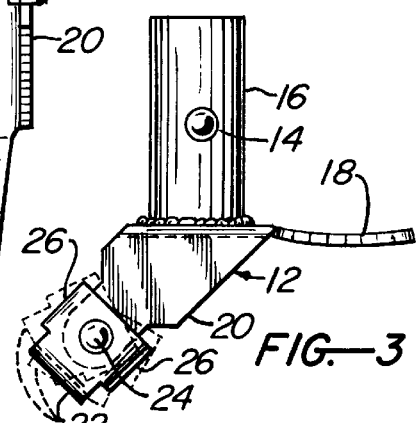
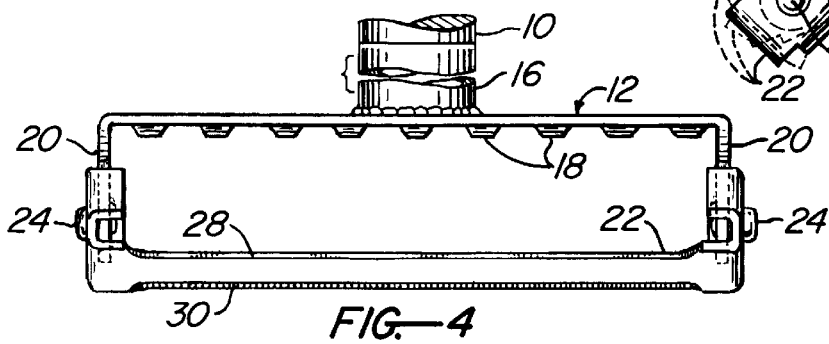

MULTIPURPOSE GARDENING TOOL

BACKGROUND OF THE INVENTION

Gardening has traditionally needed different tools for different tasks. For example, raking is a frequently required task. During the raking small plants or such can prevent the rake from being used in a given spot. A shovel or hoe is then needed to clear the obstruction. This process is time consuming as the user changes from one implement to another. As the user moves along, these different implements have to be moved in addition to the time consumed changing back and forth.

Conversely, if a person has weeds or such to clear a hoe or other cutting tool may need to be used to cut the weeds down. Then a rake must be used to help collect the weeds. Again time is lost and extra effort required to keep multiple implements in use.

BRIEF DESCRIPTION OF THE DRAWINGS

FIG. 1 is an overview of the present invention.

FIG. 2 is an end on view of head 12.

FIG. 3 is a side view of head 12.

FIG. 4 is a bottom view of head 12.

DESCRIPTION OF THE PREFERRED EMBODIMENT

FIG. 1 is an overall view of the present invention. Handle 10, which is of a length suitable for standing but can also be short for use while kneeling, has a head 12 attached to it via a neck 16. Neck 16 is attached to head 12 via welding, casting, or other suitable means of attachment. Handle 10 is connected to neck 16 by a fastening device 14 such as a carriage bolt or even by a harpoon mounting. Handle 10 may be made of wood or some other suitable material. Head 12 may be made of metal such as sprung steel or cold rolled steel.

FIG. 2 is an end view of head 12 from the perspective directly opposite to handle 10. Teeth 18 are formed to form a traditional garden rake configuration on one side of head 12. The side of head 12 with teeth 18 may also be thought of as being attached to the top of head 12. Teeth 18 may be straight, but giving them a slight bow improves the working angle with the ground. Teeth 18 may be cast, laser cut, plasma cut or stamped so as to be a single piece of metal with head 12. The number of teeth 18 and their shape and size is a matter of design.

FIG. 3 is a side view of head 12. on each side of head 12 is an extension 20 which can be welded, cast, or otherwise attached to neck 16 and teeth 18 as part of head 12. Referring back to FIG. 2, two extensions 20 are shown. Connected to extensions 20 is cutting bar 22. Cutting bar 22 is also made of metal which can be the same as that used for head 12. Cutting bar 22 is mounted to extension 20 via mounting means 24 which may be rivets, cotter pins, or so forth. Cutting bar 22 may also be rigidly attached to extension 20 by welding or similar method. As will be described below the preferred method is not to rigidly attach cutting bar 22 to extensions 20.

Referring back to FIG. 3 tabs 26 are placed at the ends of cutting bar 22 so as to bracket extensions 20. A slight space is intentionally left between tabs 26 and extension 20 so that cutting bar 22 will slightly rotate about mounting means 24. If too much play is left, the ability of cutting bar to cut is lost as cutting blade 22 will flop over. If no play is left, then cutting bar 22 is the same as a rigid hoe and more pressure or force must be applied to cut. The slight movement improves the cutting effect of cutting bar 22.

Cutting bar 22 may be sharpened along edges 28 and 30, shown in FIG. 4, so it can cut with either a pull or a push. FIG. 4 is a view along the edge or bottom of head 12. This is a second side to head 12 which is opposite to the top or side with teeth 18.

Teeth 18 may be used as a conventional rake until an obstruction is encountered. If the obstruction is a weed or similar problem, simply rotating handle 10 180° about its length-long axis permits cutting bar 22 to be used to cut off the weed.

What is claimed is:

1. A multipurpose gardening implement comprising:

a head with two sides;

teeth connected to one side of said head so as to form a rake configuration;

two side extensions connected to the second side of said head;

a cutting bar pivotably mounted to said side extension so as to be on the second side of said head and tabs mounted on said cutting bar to limit the amount of rotation of said cutting bar about said side extensions;

a neck mounted to said head; and a handle rigidly attached to said neck.

2. A multipurpose gardening implement as claimed in claim 1 further comprising two sharpened edges on said cutting bar.

* * * * *